US009802268B2

United States Patent
Cho et al.

(10) Patent No.: US 9,802,268 B2
(45) Date of Patent: Oct. 31, 2017

(54) PROJECTION WELDING DEVICE

(71) Applicant: Hyundai Motor Company, Seoul (KR)

(72) Inventors: Do-Woon Cho, Gyeonggi-Do (KR);
Chae Won Lim, Gyeonggi-Do (KR);
Yong Joon Cho, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 327 days.

(21) Appl. No.: 14/520,907

(22) Filed: Oct. 22, 2014

(65) Prior Publication Data

US 2015/0298245 A1    Oct. 22, 2015

(30) Foreign Application Priority Data

Apr. 17, 2014  (KR) .................. 10-2014-0046124

(51) Int. Cl.
| | |
|---|---|
| *B23K 11/14* | (2006.01) |
| *B23K 11/30* | (2006.01) |
| *B23K 11/31* | (2006.01) |
| *B23K 101/00* | (2006.01) |

(52) U.S. Cl.
CPC .......... *B23K 11/14* (2013.01); *B23K 11/3009* (2013.01); *B23K 11/31* (2013.01); *B23K 2201/006* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,523,367 | A * | 9/1950 | Holt ................... | B23K 11/3009 219/120 |
| 4,037,073 | A * | 7/1977 | Becker ................ | B23K 11/14 219/92 |
| 4,495,397 | A * | 1/1985 | Opprecht ............. | B23K 11/14 219/86.1 |
| 5,473,133 | A * | 12/1995 | Peterson ............ | B23K 11/14 219/81 |
| 5,510,593 | A * | 4/1996 | Sakai .................. | B23K 11/314 219/86.7 |
| 6,359,260 | B1 * | 3/2002 | Peel .................... | B23K 9/0035 219/127 |
| 6,789,722 | B2 * | 9/2004 | Murakami ......... | B23K 20/1265 228/112.1 |
| 2003/0141343 | A1 * | 7/2003 | Murakami ......... | B23K 20/1265 228/112.1 |
| 2004/0079787 | A1 * | 4/2004 | Okamoto ............ | B23K 20/125 228/112.1 |

(Continued)

FOREIGN PATENT DOCUMENTS

| | | |
|---|---|---|
| JP | 09-192846 A | 7/1997 |
| JP | 2002-008531 A | 1/2002 |
| KR | 10-2012-0000989 A | 1/2012 |

*Primary Examiner* — Anne M Antonucci
*Assistant Examiner* — Renee M Larose
(74) *Attorney, Agent, or Firm* — Mintz Levin Cohn Ferris Glovsky and Popeo, P.C.; Peter F. Corless (57) ABSTRACT

A projection welding gun device includes an upper welding tip and a lower welding tip that are combined with a gun body through a shank, where the upper welding tip presses an upper panel corresponding to a protrusion portion that is formed on a lower panel to weld the upper and lower panels, and a rotation unit that is rotated by a driving portion is disposed between the gun body and the shank to rotate the shank.

10 Claims, 6 Drawing Sheets

(56) References Cited

U.S. PATENT DOCUMENTS

2006/0043074 A1* 3/2006 Sun .................... B23K 11/3045
 219/83
2009/0208772 A1* 8/2009 Khakhalev .............. B23K 11/11
 428/594

* cited by examiner

FIG. 6

PROJECTION WELDING DEVICE

CROSS-REFERENCE TO RELATED APPLICATION

This application claims under 35 U.S.C. §119(a) priority to and the benefit of Korean Patent Application No. 10-2014-0046124 filed in the Korean Intellectual Property Office on Apr. 17, 2014, the entire contents of which are incorporated herein by reference.

BACKGROUND (a) Field of the Invention

The present invention relates to a welding gun device, more particularly, a projection welding gun device that applies pressure to a protrusion portion that is formed in a welding portion of a metal member and applies current through the protrusion portion to concentrate resistance heat therein.

(b) Description of the Related Art

In general, during a manufacturing process of a vehicle, various structural parts such as a vehicle body panel molded by a press and the like are bonded by a method such as welding to complete an integrated vehicle body, the completed vehicle body is painted and rust-prevented throughout the surface of each part in a painting process and thereafter, a design process is performed, such as assembling a power train system. Further, parts such as suspension, steering, and braking systems are assembled and subsequently, a door, a trunk lid, a hood, and the like are assembled.

Further, in a vehicle body assembling process of the vehicle, spot resistance welding through a spot welding apparatus is frequently used as a method for bonding two vehicle body panels in bonding vehicle body parts such as a roof, a pillar, a side panel, an opening unit flange of a vehicle body door, and the like.

Spot resistance welding in which pressing force is applied to a vehicle body panel surface, which is deposited by electrical resistance, is generally achieved through a spot welding apparatus installed at an arm front end of a robot for spot welding.

However, the spot welding device forms a press mark, and there is a drawback that the press mark deteriorates external appearance quality.

Particularly, after the painting process, the press mark that is formed by a welding process is not eliminated, is exposed, and may result in deteriorated product quality.

To address this drawback, a laser brazing welding is used or a cover is used to hide the welding portion, but such methods may increase manufacturing costs.

Recently, a protrusion has been formed on a lower panel so as to address the drawback of spot welding, and an electrical resistance welding is provided in which the protrusion is pressed and the current is applied through the protrusion, which is known as projection welding.

Projection welding typically involves applying high current and low pressing force to the panel such that the press mark is not formed on the panel.

Projection welding is a resistance welding that uses a projection welding gun having an upper welding tip and a lower welding tip that are mounted through a shank, where the upper welding tip presses an upper panel corresponding to a protrusion portion after forming the protrusion portion on a lower panel.

In this case, a rectangle type and a circular type may be used for a projection welding gun device.

However, in the projection welding gun device, when the rectangle type welding tip is mounted, a welding gun is to be disposed in a vertical direction on the protrusion, but the welding gun is not disposed in the vertical direction due to the interference with a jig for fixing the panel on the production site.

In this configuration, because the welding tip does not completely cover the protrusion, there is a drawback that a protruded portion is formed after the welding process.

Also, when a circular welding tip is mounted thereon, because an angle of the protrusion and the welding gun become flexible, the welding can be performed without the interference with the jig.

However, in a case that a curved surface is formed on the panel, the welding tip forms a line contact with the panel, and there is a drawback that line mark is formed on the panel.

The above information disclosed in this Background section is only for enhancement of understanding of the background of the invention and therefore it may contain information that does not form the prior art that is already known in this country to a person of ordinary skill in the art.

SUMMARY

The present invention provides a projection welding device having advantages of rotating a shank that a welding tip is mounted thereon through a rotation unit such that the jig does not interfere with the welding tip and the welding tip completely cover a protrusion.

An exemplary embodiment of the present invention provides a projection welding device having advantages of rotating a welding tip that is mounted on a shank through a swivel unit such that the welding tip is vertically engaged with a panel.

A projection welding gun device that includes an upper welding tip and a lower welding tip that are combined with a gun body through a shank, and the upper welding tip presses an upper panel corresponding to a protrusion portion that is formed on a lower panel to weld the upper and lower panels, wherein a rotation unit that is rotated by a driving portion is disposed between the gun body and the shank to rotate the shank.

The rotation unit may include a case that is disposed between the gun body and the shank, the driving portion that is disposed in the case, and a holder that is connected to the driving portion to be rotated thereby and the shank is vertically combined therewith.

The driving portion may include a step motor that the rotation speed and the rotation direction thereof can be controlled, a drive gear that is connected to a rotation shaft of the step motor, and a driven gear that is connected to an upper portion of the holder and is engaged with the drive gear.

The driving portion may include an air or hydraulic pressure cylinder, a rack gear that is disposed on the rod of the cylinder, and a pinion gear that is connected to an upper portion of the holder and is engaged with the rack gear.

The holder may be connected to the driving portion through a supporting member that is disposed in the case.

The supporting member may be one of a bearing and a bushing.

A projection welding gun device that includes an upper welding tip and a lower welding tip that are combined with a gun body through a shank, and the upper welding tip presses an upper panel corresponding to a protrusion portion that is formed on a lower panel to weld the upper and lower panels, wherein a swivel unit is disposed between the shank and the upper welding tip to make the upper welding tip contact the shank through a spherical surface.

The swivel unit may include a spherical body that is disposed at an upper end of the upper welding tip, and a rotation supporting portion that is formed in a lower end of the shank and contacts the spherical body through a spherical surface.

A projection welding gun device that includes an upper welding tip and a lower welding tip that are combined with a gun body through a shank, and the upper welding tip presses an upper panel corresponding to a protrusion portion that is formed on a lower panel to weld the upper and lower panels, wherein a rotation unit that is rotated by a driving portion is disposed between the gun body and the shank to rotate the shank, and a swivel unit is disposed between the shank and the upper welding tip to make the upper welding tip contact the shank through a spherical surface.

The rotation unit may include a case that is disposed between the gun body and the shank, the driving portion that is disposed in the case, and a holder that is connected to the driving portion and is rotated thereby, and the shank is vertically combined therewith.

The driving portion may include a step motor that can control the rotation speed and the rotation direction thereof, a drive gear that is connected to a rotation shaft of the step motor, and a driven gear that is connected to an upper portion of the holder and is engaged with the drive gear.

The driving portion may include air or hydraulic pressure cylinder, a rack gear that is disposed on the cylinder rod, and a pinion gear that is connected to an upper portion of the holder and is engaged with the rack.

The holder may be connected to the driving portion through the supporting member that is disposed in the case.

The supporting member may be one of a bearing and a bushing.

The swivel unit may include a spherical body that is formed on an upper end of the upper welding tip, and a rotation supporting portion that is formed in a lower end of the shank and contacts the spherical body through a spherical surface to be rotated.

The upper welding tip may be one of a rectangle type and a circular type.

In an exemplary embodiment of the present invention, the shank that the welding tip is disposed thereon is rotated by the rotation unit such that interference with a jig for fixing the panel is prevented, the welding tip covers all of the protrusion portion that is formed on the panel, and the protrusion portion and the punching mark can be minimized.

Also, in an exemplary embodiment of the present invention, the welding tip that is disposed on the shank is rotated through the swivel unit to contact the panel through a surface contact and a punching mark that can be formed by a line contact can be prevented, when there is a slant portion on the panel.

In addition, in an exemplary embodiment of the present invention, the welding tip is rotated through the swivel unit, and the welding tip vertically contacts the panel such that a predetermined level of welding quality can be guaranteed.

DETAILED DESCRIPTION OF THE EMBODIMENTS

Hereinafter, exemplary embodiments of the present invention will be described with reference to accompanying drawings.

The size and thickness of each element are arbitrarily shown in the drawings, but the present invention is not necessarily limited thereto, and in the drawings, the thickness of layers, films, panels, regions, etc., are exaggerated for clarity.

Also, in order to clarify the present invention, parts that are not connected with the description will be omitted, and the same elements or equivalents are referred to with the same reference numerals throughout the specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

A projection welding gun device according to exemplary embodiments of the present invention melts a narrow part instantly by applying high current for a short time, and applies low pressure force such that a press mark is not formed.

Figure 1:
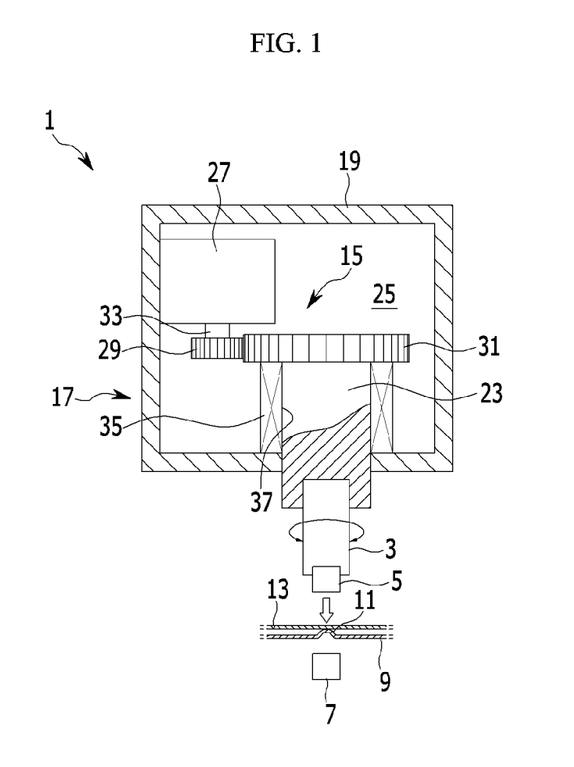
FIG. 1 is a schematic diagram of a projection welding gun device according to a first exemplary embodiment of the present invention.

FIG. 1 is a schematic diagram of a projection welding gun device according to a first exemplary embodiment of the present invention.

Referring to FIG. 1, a projection welding gun device 1 according to the first exemplary embodiment includes an upper welding tip 5 and a lower welding tip 7 that are mounted on a gun body (not shown) through a shank 3, and the upper welding tip 5 presses an upper panel 13 corresponding to a protrusion portion 11 that is formed on a lower panel 9 to perform a welding operation.

A rotation unit 17 is rotated by a driving portion 15 and rotates the shank 3, where the rotation unit 17 is disposed between the gun body and the shank 3.

In particular, the protrusion portion 11 is formed on the lower panel 9 for projection welding, which is well known to a person skilled in the art, and therefore the detailed description thereof will be omitted.

Hereinafter, the rotation unit 17 will be described in detail. The rotation unit 17 includes a case 19, a driving portion 15, and a holder 23.

The case 19 is disposed between the gun body and the shank 3, and a mounting space 25 is formed in the case. Also, the driving portion 15 is disposed in the mounting space 25 of the case 19.

In this configuration, the driving portion 15 includes a step motor 27, a drive gear 29, and a driven gear 31, where the step motor can control a rotation speed and a rotating direction.

The drive gear 29 is connected to a rotation shaft 33 of the step motor 27, and the driven gear 31 is connected to an upper portion of the holder 23 and is engaged with the drive gear 29.

The holder 23 is connected to the driving portion 15 through the driven gear 31 that is disposed on an upper portion, and the shank 3 is vertically disposed at a lower side thereof.

In the driving portion 15, the step motor 27 is operated, the drive gear 29 and the driven gear 31 are rotated, and the holder 23 that is connected to the driven gear 31 is rotated.

In this configuration, the shank 3 that is disposed on the holder 23 and the upper welding tip 5 that is disposed on the shank 3 are rotated together.

Meanwhile, when the holder 23 is connected to the driving portion 15, the holder 23 is connected thereto through a supporting member 35 that is disposed on the mounting space 25 of the case 19.

The supporting member 35 is used to make the holder 23 stably rotate and to fix the holder 23 in the mounting space 25, and a hole 37 that the holder 23 is rotatably inserted into is vertically formed therein.

In this configuration, the supporting member 35 can be one of a bearing and a bushing, the bearing and the bushing can be separately disposed, and they can be interposed between the supporting member 35 and the holder 23.

Figure 2:
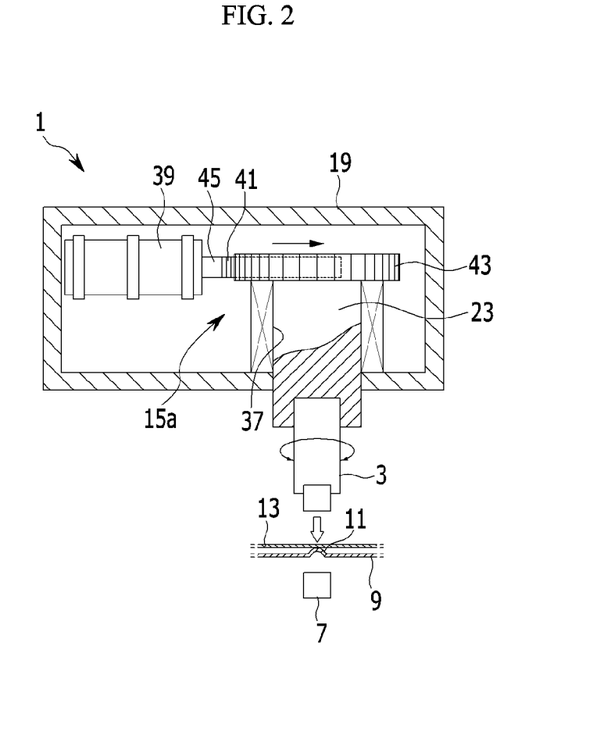
FIG. 2 is a schematic diagram showing a different configuration of a driving portion that is applied to a projection welding gun device according to the first exemplary embodiment of the present invention.

FIG. 2 is a schematic diagram showing a different configuration of a driving portion that is applied to a projection welding gun device according to the first exemplary embodiment of the present invention.

Referring to FIG. 2, the driving portion 15 having the step motor 27, the drive gear 29, and the driven gear 31 can have a cylinder 39, a rack gear 41, and a pinion gear 43.

The cylinder 39 can be one of an air and a hydraulic pressure cylinder, and the rack gear 41 is disposed on the rod 45 of the cylinder.

The pinion gear 43 is connected to an upper portion of the holder 23 and is engaged with the rack gear 41.

In the driving portion 15a, the cylinder rod 45 moves forward or reward, rotates the pinion gear 43 that is engaged therewith, and the holder 23 that is connected to the pinion gear 43 is rotated.

In this configuration, the shank 3 that is disposed on the holder 23 and the upper welding tip 5 that is disposed on the shank 3 rotate together.

Hereinafter, referring to FIG. 3 and FIG. 4, an operation of a projection welding gun device 1 according to the first exemplary embodiment having the configuration as described above will be described.

Figure 3:
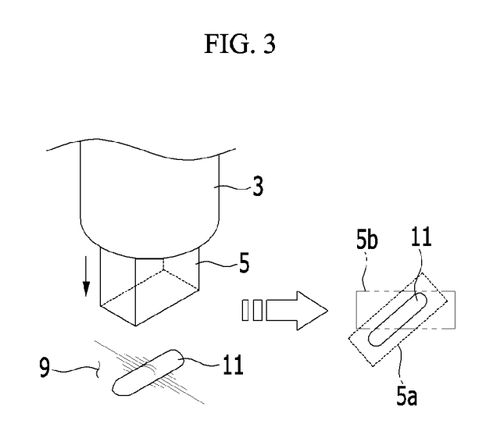
FIG. 3 and FIG. 4 each show an operational state of a projection welding gun device according to the first exemplary embodiment of the present invention.
Figure 4:
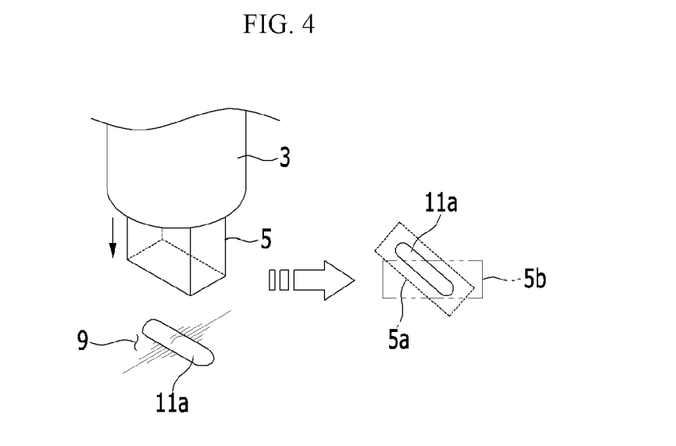

FIG. 3 and FIG. 4 show an operational state of a projection welding gun device according to the first exemplary embodiment.

Referring to FIG. 3, the upper welding tip 5 and the shank 3 are rotated by the rotation unit 17 such that the length direction of the protrusion portion 11 and the upper welding tip 5 are identical to each other.

In this configuration, the upper welding tip 5 rotates to cover all the protrusion portion 11.

After this, if the upper welding tip 5 presses the upper panel 13 corresponding to the protrusion portion 11 to perform a welding operation, an upper welding tip 5a that is shown as a broken line on a drawing covers the protrusion portion 11 to perform the welding operation.

In particular, an upper welding tip 5b that is shown as an imaginary line on a drawing is disposed to intersect with the protrusion portion 11 such that the welding operation can be prevented.

Accordingly, a projection welding gun device 1 according to the first exemplary embodiment of the present invention can avoid interference with a jig (not shown) for fixing the upper and lower panel 13 and 11 and the upper welding tip 5 covers all the protrusion portion 11 to perform a welding operation such that a protrusion is not formed on the upper panel 13, and a press mark can be minimized.

After this, referring to FIG. 4, the rotation unit 17 rotates the shank 3 so as to perform a welding operation for a protrusion portion 11a having a different length direction from the protrusion portion 11, and the welding operation is repeated.

In this configuration, the upper welding tip 5 can be one of a rectangle type and a circular type, where the upper welding tip 5 has a rectangle type in the first exemplary embodiment of the present invention.

Figure 5:
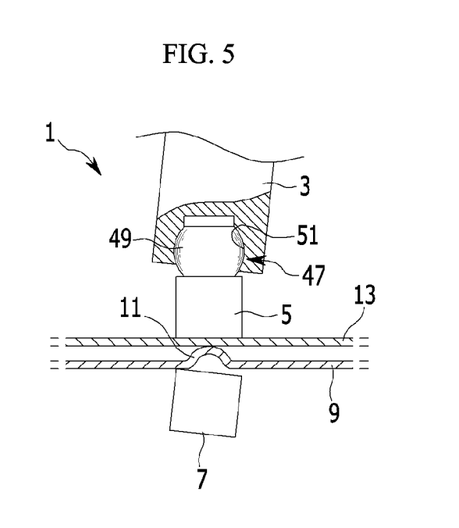
FIG. 5 is a schematic diagram of a projection welding gun device according to a second exemplary embodiment of the present invention.

FIG. 5 is a schematic diagram of a projection welding gun device according to a second exemplary embodiment of the present invention.

Referring to FIG. 5, a projection welding gun device 1 according to the second exemplary embodiment has a swivel unit 47 that is disposed between the shank 3 and the upper welding tip 5, which is different from that of the first exemplary embodiment, in which the rotation unit 17 rotates the shank 3.

The swivel unit 47 makes the upper welding tip 5 contact the shank 3 through a spherical surface and rotates the upper welding tip 5. Also, the swivel unit 47 can include a spherical body 49 and a rotation support portion 51.

The spherical body 49 is disposed at an upper end of the upper welding tip 5, the rotation supporting portion 51 has a groove corresponding to the spherical body 49 inside a lower end of the shank 3, and the body 49 contacts the portion 51 through a spherical surface.

In the swivel unit 47 of the projection welding gun device 1 according to the second exemplary embodiment of the present invention, when the upper welding tip 5 contacts a slanted surface of the upper panel 13, the upper welding tip 5 rotates through the rotation supporting portion 51 and the spherical body 49.

Accordingly, during the welding operation, the upper welding tip 5 rotates to realize a vertical condition with the upper panel 13 and can realize surface contact the upper panel 13, and a press mark that is generated by a line contact of the upper welding tip 5 and the upper panel 13 can be prevented.

In particular, although the shank 3 and the upper welding tip 5 are not vertical to the upper panel 13, because the upper welding tip 5 contacts a slant surface of the upper panel 13 and is rotated to a vertical condition through the swivel unit 47, a punching mark (press mark) is not prevented.

Meanwhile, the upper welding tip 5 can be a rectangle type or a circular type, and the circular type of the upper welding tip 5 can be used in the second exemplary embodiment.

Figure 6:
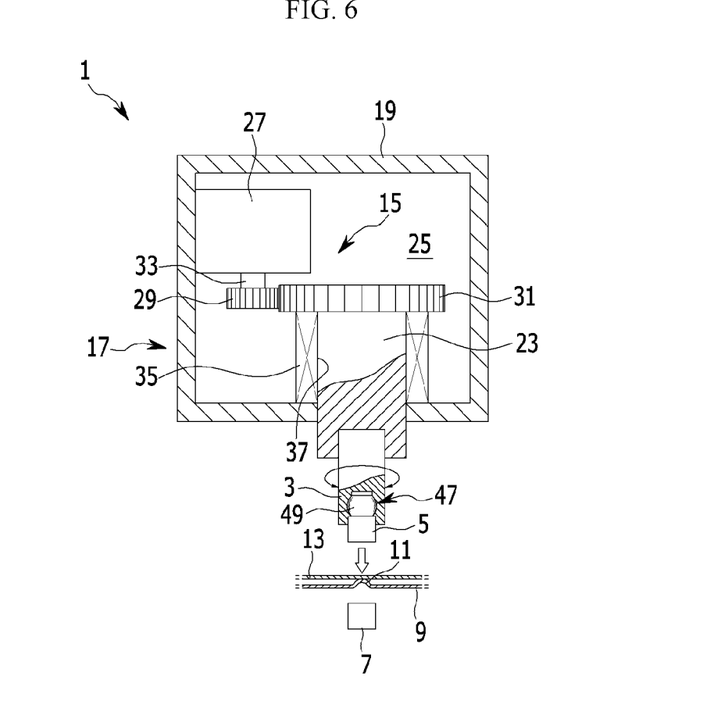
FIG. 6 is a schematic diagram of a projection welding gun device according to a third exemplary embodiment of the present invention.

FIG. 6 is a schematic diagram of a projection welding gun device according to a third exemplary embodiment of the present invention.

Referring to FIG. 6, a projection welding gun device 1 according to the third exemplary embodiment has a similar configuration and function with the first and the second embodiments.

In particular, the rotation unit 17 is disposed between the gun body and the shank 3 in the first exemplary embodiment, and the swivel unit 47 is disposed between the shank 3 and the upper welding tip 5 to rotate the upper welding tip 5 in the second exemplary embodiment.

Meanwhile, the rotation unit 17 and the swivel unit 47 are disposed together in the third exemplary embodiment.

In a projection welding gun device 1 according to the third exemplary embodiment of the present invention, an interference with a jig (not shown) for fixing the upper and lower panel 13, 9 can be avoided during the welding operation, because the upper welding tip 5 covers all the protrusion portion 11, the protruded portion is not generated on the upper panel 13, and the press mark (punching mark) can be minimized.

In addition, the upper welding tip 5 rotates through the swivel unit 47 to maintain a vertical condition with the upper panel 13 such that the upper welding tip 5 contacts the upper panel 13 through a surface contact, and therefore a punching mark that is generated from a line contact of the upper welding tip 5 and the panel 13 can be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A projection welding gun device, comprising:
    an upper welding tip and a lower welding tip that are combined with a gun body through a shank, wherein the upper welding tip presses an upper panel corresponding to a protrusion portion that is formed on a lower panel to weld the upper and lower panels; and
    a rotation unit that is rotated by a driving portion, the rotation unit being disposed between the gun body and the shank to rotate the shank,
    wherein the rotation unit includes:
    a case that is disposed between the gun body and the shank;
    the driving portion that is disposed in the case; and
    a holder that is connected to the driving portion to be rotated thereby and the shank is vertically combined therewith, and
    wherein the driving portion includes:
    an air or hydraulic pressure cylinder;
    a rack gear that is disposed on a rod of the cylinder; and
    a pinion gear that is connected to an upper portion of the holder and is engaged with the rack gear.

2. The projection welding gun device of claim 1, wherein the driving portion includes:
    a step motor configured to control a rotation speed and a rotation direction;
    a drive gear that is connected to a rotation shaft of the step motor; and
    a driven gear that is connected to the upper portion of the holder and is engaged with the drive gear.

3. The projection welding gun device of claim 1, wherein the holder is connected to the driving portion through a supporting member that is disposed in the case.

4. The projection welding gun device of claim 3, wherein the supporting member is one of a bearing and a bushing.

5. A projection welding gun device, comprising:
    an upper welding tip and a lower welding tip that are combined with a gun body through a shank, wherein the upper welding tip presses an upper panel corresponding to a protrusion portion that is formed on a lower panel to weld the upper and lower panels;
    a rotation unit that is rotated by a driving portion, the rotation unit being disposed between the gun body and the shank to rotate the shank; and
    a swivel unit disposed between the shank and the upper welding tip to make the upper welding tip contact the shank through a spherical surface,
    wherein the rotation unit includes:
    a case that is disposed between the gun body and the shank;
    the driving portion that is disposed in the case; and
    a holder that is connected to the driving portion and is rotated thereby, and the shank is vertically combined therewith, and
    wherein the driving portion includes:
    air or hydraulic pressure cylinder;
    a rack gear that is disposed on a cylinder rod; and
    a pinion gear that is connected to an upper portion of the holder and is engaged with a rack.

6. The projection welding gun device of claim 5, wherein the driving portion includes:
    a step motor configured to control a rotation speed and a rotation direction thereof;
    a drive gear that is connected to a rotation shaft of the step motor; and
    a driven gear that is connected to the upper portion of the holder and is engaged with the drive gear.

7. The projection welding gun device of claim 5, wherein the holder is connected to the driving portion through a supporting member that is disposed in the case.

8. The projection welding gun device of claim 7, wherein the supporting member is one of a bearing and a bushing.

9. The projection welding gun device of claim 5, wherein the swivel unit includes:
    a spherical body that is formed on an upper end of the upper welding tip; and
    a rotation supporting portion that is formed in a lower end of the shank and contacts the spherical body through a spherical surface to be rotated.

10. The projection welding gun device of claim 5, wherein the upper welding tip is one of a rectangle shape and a circular shape.

\* \* \* \* \*